United States Patent

[11] 3,587,620

[72] Inventor Gottfried Berthold
Leonberg, Germany
[21] Appl. No. 689,050
[22] Filed Dec. 8, 1967
[45] Patented June 28, 1971
[73] Assignee Robert Bosch GmbH
Stuttgart, Germany
[32] Priority Dec. 16, 1966
[33] Germany
[31] B90366

[54] VAPORIZING AND FLUID FLOW MEANS
8 Claims, 1 Drawing Fig.

[52] U.S. Cl. .......... 137/154, 118/48
[51] Int. Cl. .......... B67d 5/54
[50] Field of Search .......... 148/189, 188, 174, 175; 117/106, (Inquired); 252/62.3; 118/7, 8, 48—49.5; 23/254; 137/106—122, 154; 261/(Inquired); 73/422 (GC)

[56] References Cited

UNITED STATES PATENTS

| | | | |
|---|---|---|---|
| 2,887,089 | 5/1959 | Homer et al. .......... | 118/49X |
| 3,171,755 | 3/1965 | Reuschel et al. .......... | 118/49.5X |
| 3,316,121 | 4/1967 | Lombos et al. .......... | 118/48X |
| 3,348,984 | 10/1967 | Pammer .......... | 118/49.1X |
| 3,352,644 | 11/1967 | Lystj .......... | 23/254X |
| 3,386,857 | 6/1968 | Steinmaier .......... | (118/48) |

*Primary Examiner*—Morris Kaplan
*Attorney*—Michael S. Striker

ABSTRACT: In doping a semiconductor the doping agent is confined in an enclosed vessel in vaporized state. A stream of gaseous carrier is intermittently passed through the vessel to enrich the carrier with a quantity of the vaporized doping agent. Thereupon, the thus enriched gaseous carrier is passed into contact with a semiconductor maintained at elevated temperature whereby the semiconductor is doped with the aforementioned quantity of vaporized doping agent.

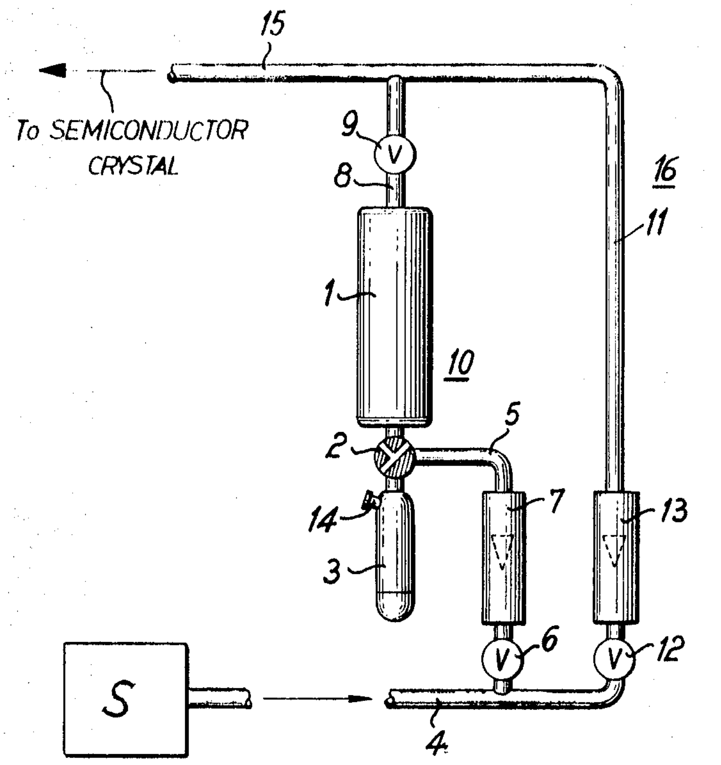
INVENTOR:
Gottfried BERTHOLD
By Michael S. Striker
Attorney

VAPORIZING AND FLUID FLOW MEANS

BACKGROUND OF THE INVENTION

The invention generally relates to the doping of semiconductors, and more particularly to an apparatus for carrying out the method.

It is well known that in the manufacture of semiconductors impurities are added to crystals of germanium, silicon, or others having the requisite properties to thereby create a condition in the electronic structure of the crystals which corresponds to a "hole." Depending upon the type of doping agent involved, these impurities are known as "acceptor" impurities or as "donor" impurities. The addition of such impurities must be controlled with a high degree of precision.

In one known method of carrying out the addition of such impurities a gaseous carrier is caused to flow from a nozzle through the liquid doping agent, and the thus enriched gaseous carrier is then conducted into contact with the semiconductor body which is maintained at elevated temperature. However, it will be understood that the doping effect must be both well defined and reproducible, particularly where low concentrations of impurities are required, and this is extremely difficult with this aforementioned approach in which small streams of gaseous carrier are needed for the purpose, which are very difficult to measure and to control.

SUMMARY OF THE INVENTION

The present invention overcomes the aforementioned disadvantages.

More particularly, the present invention provides an apparatus for doping semiconductors which affords a precisely defined and reproducible doping effect.

In accordance with one feature of my invention, I provide means for the doping of semiconductors, which involves confining a doping agent in vaporized state within an enclosed vessel, and intermittently passing through the vessel a stream of gaseous carrier to thereby enrich the same with a quantity of vaporized doping agent. The thus enriched gaseous carrier is then passed into contact with a heated semiconductor whereby the latter is doped with the aforementioned quantity of vaporized doping agent.

With my above apparatus I obtain reproducible well-defined concentrations of doping agent.

In accordance with a preferred feature of my invention the vapor phase of the doping agent is produced in the enclosed vessel by connecting the same with a receptacle which contains the doping agent both in liquid and in vapor form, and in which receptacle a predetermined vapor pressure of the doping agent has been produced, for instance by thermostatic means or by subjecting the receptacle to the influence of an ice bath. After the predetermined vapor pressure has been obtained in the receptacle as just outlined, the receptacle is placed into communication with the enclosed vessel to permit entry of the vaporized agent into the vessel. The precision obtainable with my method is enhanced if such communication is maintained until equalization of vapor pressures has taken place, so that the vaporized doping agent in the vessel will be at the same partial vapor pressure as that which obtains in the receptacle. Thereupon, communication between the receptacle and the vessel is terminated and gaseous carrier is introduced into the vessel in the aforementioned manner.

In the event that the concentration of doping agent is to be further reduced this can be accomplished in accordance with my invention by admixing the enriched gaseous carrier with pure additional gaseous carrier prior to its engagement with the heated semiconductor.

The novel features which are considered as characteristic for the invention are set forth in particular in the appended claims. The invention itself, however, as to its construction, together with additional objects and advantages thereof, will be best understood from the following description of specific embodiment when read in connection with the accompanying drawing.

BRIEF DESCRIPTION OF THE DRAWING

The single FIGURE illustrates in somewhat diagrammatic form an apparatus for carrying out my invention.

DESCRIPTION OF THE PREFERRED EMBODIMENTS

Discussing now the drawing in detail it is pointed out that reference numeral 1 identifies a closed vessel within which the gaseous carrier is to be enriched with the doping agent. The carrier itself may be any inert gas but preferably is a mixture of nitrogen and oxygen. Doping agents suitable for the purposes here under discussion are well known and include, by way of example, boron bromide ($BBr_3$) or phosphor chloride ($PC1_3$).

The closed vessel 1 is connected with a receptacle 3 by means of a three-way valve 2 of known construction. The receptacle 3 is provided with an inlet 14 through which the doping agent is introduced in liquid form. A conduit 4 carries gaseous carrier which is derived from a source of supply S. The conduit 4 is connected via a branch conduit 5 with the three-way valve 2. Interposed in the branch conduit 5 are a regulating valve 6 and a pressure flow meter 7.

An additional conduit 11 also communicates with the conduit 4 and has interposed therein a further regulating valve 12 and a further flow meter 13. The construction of the regulating valves and of the flow meters is of no significance in the context of the present invention and many well known devices of the respective types will be suitable for the purposes at hand.

An outlet conduit 8 communicates with the enclosed vessel 1 and has arranged therein a stop valve 9 which is normally closed and is operable to open the outlet conduit, The additional conduit 11 communicates with the outlet conduit 8 downstream of the stop valve 9. From the point of juncture of the conduits 11 and 8 a supply conduit 15 leads to a user, namely to a location where a heated semiconductor body, which may for instance consist of silicium, is maintained in readiness for the doping process. The additional conduit 11 in effect constitutes a main-flow conduit 16 whereas the elements 5, 1 and 8 together constitute a bypass conduit 10.

In operation of the device just described the doping agent is initially introduced into the receptacle 3 through the inlet 14 thereof. The doping agent is in liquid form and, after it has been introduced and the inlet 14 has been closed, the valve 2 is set so as to establish communication of both the receptacle 3 and the vessel 1 with the branch conduit 5, so that the receptacle 3 and the vessel 1 are both filled with gaseous carrier. During this process the stop valve 9 is closed.

Now the valve 2 is operated so as to disconnect the receptacle 3 from the vessel 1, and to disconnect both from the branch conduit 5. Once this is done the receptacle 3 is caused to assume a predetermined temperature, for instance by partly or completely immersing it in the tempering bath of a thermostat or in an ice bath, to thereby cause the doping agent, which of course is present in the receptacle 3 in partly liquid and partly vapor phase, to assume a constant temperature whereby the vapor phase has imparted thereto a predetermined vapor pressure which is determined solely by the temperature of the receptacle 3.

Communication is now reestablished by suitable operation of the valve 2 between the receptacle 3 and the vessel 1. If, in accordance with the invention, the temperature of the receptacle 3 is the lowest temperature prevailing in the apparatus, the vapor phase which has entered the vessel 1 from the receptacle 3 will assume a vapor pressure equilibrium with respect to the vapor phase still remaining in the receptacle 3, if communication between the two is maintained for a sufficient period of time. Once this equilibrium is reached the valve 2 is actuated in a sense interrupting communication between the vessel 1 and the receptacle 3, and establishing communication between the vessel 1 and the branch conduit 5. A stream of gaseous carrier now flows from the branch conduit 5 into the vessel 1. The magnitude of this stream is selected by means of the regulating valve 6 and controlled via the pressure flow meter 7. It is evident that the stop valve 9 will be opened before such communication is established so that the stream of gaseous carrier entering the vessel from the branch conduit 5 will blow the contents of the vessel 1 into and through the outlet conduit 8. Evidently, the stream of gaseous carrier thus becomes enriched with the contents of the vessel 1. From the outlet conduit 8 the thus enriched stream of gaseous carrier is conducted to the (nonillustrated) semiconductor body which is maintained at high temperature and to which it introduces the impurities in well-known manner.

In circumstances where it is desired or necessary to reduce the concentration of doping agent vapor in the mixture of vapor and gaseous carrier issuing from the outlet conduit 8, pure additional gaseous carrier is admixed therewith downstream of the stop valve 9 by permitting such additional gaseous carrier to pass through the additional conduit 16. The quantity of additional carrier can be regulated by means of the regulating valve 12 in the conduit 16, and is supervised via the flow meter 13. This, however, is not the only way in which the concentration of doping agent can be influenced. It is to be understood that such influence can also be exerted within a wide range of possibilities by varying the temperature of the receptacle 3.

By resorting to my novel apparatus, the arrangement and form of vessels and receptacles remains completely without influence on the doping process, thus assuring a well-defined and precisely reproducible doping effect. While my novel apparatus are generally applicable to the doping of semiconductors they are of particular advantage in applications where it is desired to obtain low surface concentrations on the order of $10^{18}$ atoms per $cm^3$, that is in circumstances where the devices known heretofore have been found particularly unsatisfactory.

While the invention has been illustrated and described as embodied in an apparatus for doping of semiconductors, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims. What is claimed as new and desired to be protected by Letters Patent is set forth in the appended claims.

I claim:

1. Apparatus of the character described, comprising, in combination, a first closed receptacle containing vaporized doping agent at a predetermined vapor pressure; a second closed receptacle; supply means for supplying a stream of gaseous carrier; and valve means operatively connecting said receptacles with one another and with said supply means, said valve means being displaceable between a first position connecting said supply means with both of said receptacles whereby to introduce gaseous carrier into the latter, a second position connecting said receptacles with one another for admittance of vaporized doping agent from said first into said second receptacle while disconnecting both said receptacles from said supply means, and a third position disconnecting said first receptacle from said supply means while connecting the latter with said second receptacle for admitting gaseous carrier into said second receptacle to be enriched by the vaporized doping agent contained therein.

2. Apparatus as defined in claim 1; and further comprising an outlet conduit communicating with said second receptacle and with a user for conducting the thus enriched gaseous carrier from the former to the latter for subsequent contact with a heated semiconductor; and further comprising a normally closed stop valve interposed in said outlet conduit and operable for opening and blocking the same.

3. Apparatus as defined in claim 2; and further comprising an additional conduit communicating with said source of gaseous carrier and with said outlet conduit downstream of said stop valve for admitting additional gaseous carrier into the enriched gaseous carrier in said outlet conduit, said additional conduit constituting a main flow conduit, and said conduit means, second receptacle and outlet conduit together constituting a bypass conduit.

4. Apparatus as defined in claim 3; and further comprising flow-metering means and flow-regulating valve means interposed in said additional conduit for metering and regulating the flow of said additional gaseous carrier therethrough.

5. Apparatus as defined in claim 1; further comprising admitting means for admitting said doping agent into said first receptacle in liquid state prior to introduction of gaseous carrier into said first receptacle with concomitant at least partial conversion of the liquid doping agent to a vapor phase.

6. Apparatus as defined in claim 5; and imparting means for imparting to said vapor phase a predetermined vapor pressure.

7. Apparatus as defined in claim 6, said imparting means comprising heating means for heating said first receptacle to a predetermined constant temperature to thereby impart to said vapor phase said predetermined vapor pressure.

8. Apparatus as defined in claim 1, wherein said supply means comprises a source of gaseous carrier, and conduit means connecting said source with said valve means; and further comprising a flow meter and a flow regulating valve interposed in said conduit means for measuring and regulating the flow of gaseous carrier from said source to said valve means.